Feb. 5, 1957 C. R. SHEA ET AL 2,780,002
DENTAL TEACHING AID
Filed Feb. 7, 1956
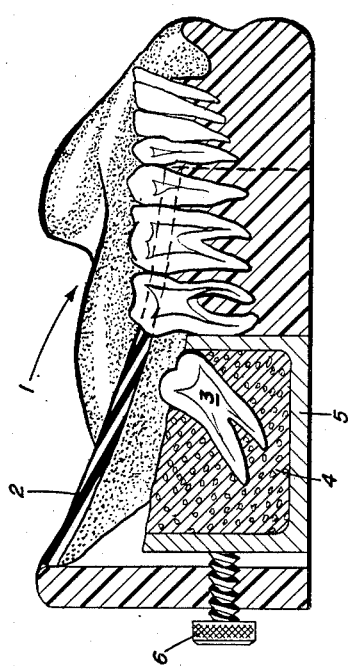
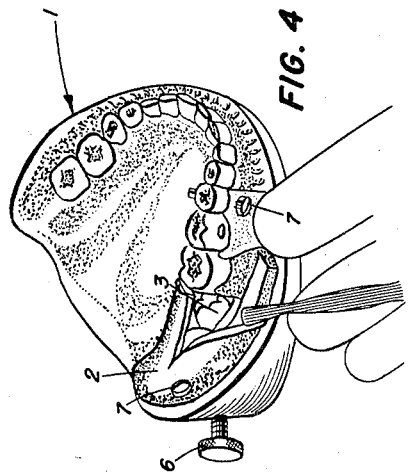
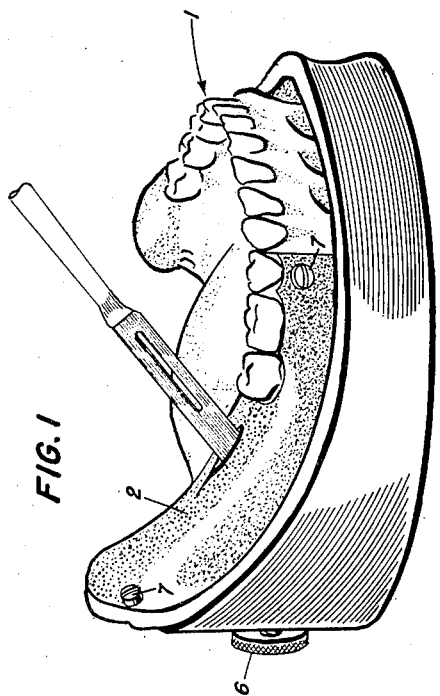
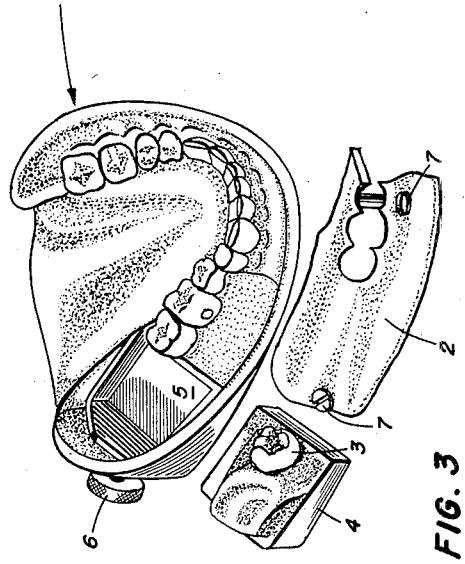
INVENTORS
CHARLES R. SHEA
JOHN V. NIIRANEN
BY
ATTORNEYS

United States Patent Office 2,780,002
Patented Feb. 5, 1957

2,780,002

DENTAL TEACHING AID

Charles R. Shea, Johnstown, Pa., and John V. Niiranen, Bethesda, Md.

Application February 7, 1956, Serial No. 564,086

7 Claims. (Cl. 32—71)

(Granted under Title 35, U. S. Code (1952), sec. 266)

The invention described herein may be manufactured and used by or for the Government of the United States of America for governmental purposes without the payment of any royalties thereon or therefor.

The present invention relates to a dental teaching aid in the form of a model of the oral cavity used to demonstrate oral surgical procedures and operations and particularly to demonstrate removal of an impacted tooth. The invention comprises a plastic model having a removable segment containing an impacted tooth, with a plastic or rubber cover adapted to cover and conceal the tooth, the cover tending to simulate a portion of the gum, said simulated gum being open along its upper edge to give access to the tooth.

Heretofore, no satisfactory means had been available for purposes of instruction as to the exact nature of the performance of a surgical operation in the oral cavity for purposes of extracting an impacted tooth. An impacted tooth is one which is wedged either between two other teeth or the jawbone and another tooth in such a manner as not to be permitted to extend from the gum parallel to the other teeth in the mouth, but to grow perpendicularly to said other teeth and parallel with the jawbone or gumline; an impacted tooth may be partially or totally covered by the gum tissue. Due to the relatively small size of the human oral cavity and the difficulty of working in such an enclosed area, it is not readily possible to demonstrate the problems and techniques involved in removing an impacted tooth from the oral cavity; also the gravity of a surgical operation of this type allows little margin for error in a student's first attempts.

The invention will permit the student to practice the techniques involved in removing an impacted tooth before he attempts to perform such an operation in actuality; both students and laymen will be able to better understand the problems and techniques utilized in the performance of said operation.

An object of the present invention is to provide a model of the oral cavity with an impacted tooth, to serve as a teaching aid in demonstrating the location of said tooth and the problems it may cause.

Another object is to provide a working model of the oral cavity with an impacted tooth, in order that the techniques employed in extracting said tooth may be demonstrated.

A further object of the invention is to provide a working model of the oral cavity with an impacted tooth in order that a student may practice the technique of extracting said tooth before working on living subjects.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 shows a perspective view of a preferred embodiment of the invention.

Fig. 2 shows a cross section of the view shown in Fig. 1.

Fig. 3 shows a perspective view of the invention and its component parts.

Fig. 4 shows a perspective view of the invention demonstrating its similarity to actual working conditions as they may exist in the human mouth.

Referring now to the drawings, wherein like reference characters designate like or corresponding parts throughout the several views, there is shown in Figs. 1 and 2, which illustrate a perspective view and cross section of a preferred embodiment of the invention, a plastic model 1 of the human jaw or lower mouth and teeth, a plastic model of the lower mandibular mucous membrane 2, which is mounted on said model of the mouth and secured by pins 7 and a plastic box 5 of rectangular shape which fits into an extended portion of model 1 and directly under and supporting the mucous membrane 2. Said plastic box 5, which is locked in proper position within model 1 by screw lock 6, holds a natural tooth 3 which is encased in a dental plaster 4.

The model and teeth 1 and box 5 may be made of any rigid plastic material which will give the natural color and appearance of teeth and gums, such as acrylic resin which is commonly used in the dental profession. The plastic model of the mucous membrane 2, may be made out of any soft pliable material capable of being preformed into a given shape such as vinyl resin or rubber; said material being susceptible of incision with a surgical knife as actual gum would be. The plaster 4 used for anchoring tooth 3 in an impacted position, may be stone, which is a plaster-like material commonly known in the dental art, and is similar to but very much harder than plaster of Paris. The box 5 may be made of acrylic resin such as model 1 or any similar material.

Figs. 3 and 4 show more clearly the relationship of the component parts one with the other and their cooperation as a device for demonstration or instructional purposes as well as a working model for students to practice on. In Fig. 3 the components of the model have been collected prior to assembly. The tooth 3, which may be any natural tooth, has been set in plaster 4 prior to insertion into box 5, and mucous membrane 2 is ready to be mounted in its proper place over tooth 3. In Fig. 4 it can be clearly seen how the model functions as a training device, since an incision has been made with a surgical knife and the mucous membrane has been laid open to display the position of the impacted tooth.

From the above description of the model its value as a demonstrator and teaching aid can readily be appreciated. The size of the impacted tooth and its angular position in the oral cavity can be varied over an almost limitless number of positions so that when a new simulated mucous membrane is mounted over the tooth an almost endless variety of problems is presented to the student.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

For example, the impacted tooth chosen for description in this specification was the mandibular third molar or wisdom tooth, however, the device could be utilized in the same manner as described for demonstrating the removal of any other impacted tooth which might occur in the oral cavity, either in the upper or lower mouth.

We claim:

1. An article of manufacture comprising a unit including an artificial mouth, an artificial mandibular mucous membrane secured to said mouth, a box of such size as to fit in an extended portion of said mouth and under said membrane, and a tooth encased in plaster in said box so as to make a unified component which is locked in said extended portion of said mouth.

2. An educational appliance comprising an artificial jaw with a plurality of teeth set therein, a recess in one portion of said jaw, an artificial tooth encased in a retaining means, said retaining means being shaped for insertion in said recess, and an artificial mucous membrane secured to said jaw and covering the tooth and retaining means.

3. An educational appliance as in claim 2 and having a manually adjustable means for securing the retaining means within the recess.

4. An educational device comprising an artificial jaw with a plurality of teeth set therein, a recess in one portion of said jaw adjacent to the last tooth, an artificial tooth angularly encased in a retaining means, said retaining means being shaped for insertion in said recess, and an artificial mucous membrane secured to said jaw and covering the tooth and retaining means.

5. An educational device comprising an artificial jaw with a plurality of teeth set therein, a rectangular recess extending below the gum-line, a removable box within said recess, an artificial tooth secured to said box, an artificial mucous membrane covering said recess, and securing means for retaining said box in said recess.

6. An educational device comprising an artificial jaw, a rectangular recess extending below the gum-line of the jaw, a removable box positioned within the recess, an artificial tooth angularly secured within the box, said artificial tooth pointing toward an adjacent tooth as though impacted, a relatively soft flexible membrane covering the recess, and retaining means for holding the box within the recess.

7. An educational device comprising an artificial jaw, a rectangular recess in one portion of said jaw adjacent to the last tooth and extending below the gum-line of the jaw, a removable box positioned within the recess, an artificial tooth angularly secured within the box, said artificial tooth pointing toward an adjacent tooth as though impacted, a relatively soft flexible membrane covering the recess and artificial tooth, and a manually adjustable retaining means for holding the box within the recess.

References Cited in the file of this patent
UNITED STATES PATENTS

| | | |
|---|---|---|
| 2,657,462 | Arrow | Nov. 3, 1953 |
| 2,674,802 | Williams | Apr. 13, 1954 |